US012724390B2

(12) United States Patent
Fujimura et al.

(10) Patent No.: US 12,724,390 B2
(45) Date of Patent: Sep. 1, 2026

(54) APPLIANCE CONTROL METHOD, RECORDING MEDIUM, AND APPLIANCE CONTROL DEVICE

(71) Applicant: Panasonic Intellectual Property Corporation of America, Torrance, CA (US)

(72) Inventors: Ryota Fujimura, Kanagawa (JP); Shigehiro Iida, Tokyo (JP); Toshiyuki Shimizu, Osaka (JP); Nobuhiko Wakai, Tokyo (JP); Yumiko Shinohara, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 438 days.

(21) Appl. No.: 18/216,043

(22) Filed: Jun. 29, 2023

(65) Prior Publication Data

US 2023/0341831 A1 Oct. 26, 2023

Related U.S. Application Data

(63) Continuation of application No. PCT/JP2021/037667, filed on Oct. 12, 2021.

(30) Foreign Application Priority Data

Jan. 6, 2021 (JP) ................................ 2021-000896

(51) Int. Cl.
*G05B 19/042* (2006.01)

(52) U.S. Cl.
CPC .. *G05B 19/042* (2013.01); *G05B 2219/23238* (2013.01)

(58) Field of Classification Search
CPC ........ G05B 19/042; G05B 2219/23238; G05B 2219/2613; G05B 2219/2614; H04Q 9/00
See application file for complete search history.

(56) References Cited

U.S. PATENT DOCUMENTS 6,650,247 B1 * 11/2003 Hayes ................ H04B 10/1141 340/12.23
2007/0233285 A1 10/2007 Yamamoto
(Continued)

FOREIGN PATENT DOCUMENTS

JP 8-7188 1/1996
JP 3140911 3/2001
(Continued)

OTHER PUBLICATIONS

International Search Report (ISR) issued on Jan. 11, 2022 in International (PCT) Application No. PCT/JP2021/037667.

*Primary Examiner* — Mohammad Ali
*Assistant Examiner* — Sheela Rao
(74) *Attorney, Agent, or Firm* — Wenderoth, Lind & Ponack, L.L.P.

(57) ABSTRACT

An appliance control method and appliance control device is disclosed, the appliance control method includes: acquiring a user action of a user and predicting a plurality of action information items about future user actions of the user based on the user action, the plurality of action information items including a plurality of actions and predicted times at which the plurality of actions are predicted to be performed. The appliance control method further includes determining appliance control operations corresponding to the plurality of actions based on the plurality of actions and the predicted times and performing the appliance control operations based on the predicted times.

10 Claims, 10 Drawing Sheets

(56) References Cited

U.S. PATENT DOCUMENTS

| | | | | |
|---|---|---|---|---|
| 2011/0029465 | A1 | 2/2011 | Ito et al. | |
| 2014/0285017 | A1 | 9/2014 | Noguchi et al. | |
| 2020/0341436 | A1* | 10/2020 | Saxena | G05B 13/0265 |

FOREIGN PATENT DOCUMENTS

| | | | |
|---|---|---|---|
| JP | 2010-50664 | | 3/2010 |
| JP | 2011-34402 | | 2/2011 |
| JP | 4741500 | | 8/2011 |
| JP | 2014-099687 | A | 5/2014 |
| JP | 2014-186938 | | 10/2014 |
| JP | 2015-159379 | A | 9/2015 |
| JP | 6098273 | | 3/2017 |
| JP | 2017-182531 | | 10/2017 |
| JP | 2017182531 | A * | 10/2017 |
| JP | 2018-007385 | A | 1/2018 |
| JP | 2019-146053 | A | 8/2019 |
| JP | 2019-220867 | A | 12/2019 |
| JP | 2020-511703 | | 4/2020 |
| WO | 2018/144186 | | 8/2018 |
| WO | 2018/154711 | A1 | 8/2018 |
| WO | 2019/229978 | A1 | 12/2019 |

* cited by examiner

1

100 Appliance control device

200 Sensor

101 Information acquirer

102 Predictor

103 Control operation determiner

104 Control instruction generator

300a Appliance

300b Appliance

300c Appliance

400a Appliance

400b Appliance

400c Appliance

| No. | User actions and state changes in appliances | Time |
|---|---|---|
| 1 | Arrive home | 20:00:00 |
| 2 | Entrance light switched to ON | 20:00:01 |
| 3 | Move from entrance to hallway A | 20:00:15 |
| 4 | Move from hallway A to bathroom | 20:00:20 |
| 5 | Bathroom light switched to ON | 20:00:25 |
| 6 | Wash hands | 20:00:30 |
| 7 | Entrance light switched to OFF by human sensor | 20:00:50 |
| 8 | Bathroom light switched to OFF | 20:02:30 |
| 9 | Move from bathroom to living room | 20:02:35 |
| 10 | Living room light switched to ON | 20:02:38 |
| 11 | Sit on sofa | 20:02:43 |
| 12 | TV switched to ON | 20:02:45 |
| 13 | Air conditioner switched to ON | 20:02:48 |
| | ... | ... |

| No. | User actions and state changes in appliances | Time |
|---|---|---|
| 1 | Arrive home | 20:00:00 |
| 2 | Entrance light switched to ON | 20:00:01 |
| 3 | Move from entrance to hallway A | 20:00:15 |
| 4 | Move from hallway A to toilet | 20:00:20 |
| 5 | Toilet light switched to ON | 20:00:25 |
| 6 | Electronic toilet seat switched to ON | 20:01:20 |
| 7 | Electronic toilet seat switched to OFF | 20:01:30 |
| 8 | Wash hands in toilet | 20:02:00 |
| 9 | Toilet light switched to OFF | 20:02:10 |
| 10 | Move from toilet to living room | 20:02:15 |
| 11 | Living room light switched to ON | 20:02:25 |
| 12 | Sit on sofa | 20:02:30 |
| 13 | TV switched to ON | 20:02:32 |
| 14 | Air conditioner switched to ON | 20:02:35 |
| | ... | ... |

| No. | User actions and state changes in appliances | Time |
|---|---|---|
| 1 | Arrive home | 20:00:00 |
| 2 | Entrance light switched to ON | 20:00:01 |
| 3 | Move from entrance to hallway A | 20:00:15 |
| 4 | Move from hallway A to bathroom | 20:00:20 |
| 5 | Bathroom light switched to ON | 20:00:25 |
| 6 | Wash hands | 20:00:30 |
| 7 | Entrance light switched to OFF by human sensor | 20:00:50 |
| 8 | Bathroom light switched to OFF | 20:02:30 |
| 9 | Move from bathroom to dining room | 20:02:35 |
| 10 | Refrigerator opened | 20:02:38 |
| 11 | Refrigerator closed | 20:02:48 |
| 12 | Move from kitchen to living room | 20:03:30 |
| 13 | Living room light switched to ON | 20:03:33 |
| 14 | Sit on sofa | 20:03:38 |
| 15 | Air conditioner switched to ON | 20:03:40 |
|  | ... | ... |

FIG. 4

| State changes in appliances | Occurrence probability | Estimated occurrence time |
|---|---|---|
| Entrance light switched to ON | 100% | Less than 30 sec. |
| Bathroom light switched to ON | 70% | 30 sec. or more and less than 3 min. |
| Entrance light switched to OFF | 100% | 30 sec. or more and less than 3 min. |
| Bathroom light switched to OFF | 100% | 30 sec. or more and less than 3 min. |
| Refrigerator opened | 20% | 1 min. or more and less than 5 min. |
| Refrigerator closed | 20% | 1 min. or more and less than 5 min. |
| Toilet light switched to ON | 30% | 1 min. or more and less than 5 min. |
| Electronic toilet seat switched to ON | 30% | 1 min. or more and less than 5 min. |
| Toilet light switched to OFF | 30% | 1 min. or more and less than 5 min. |
| Electronic toilet seat switched to OFF | 30% | 1 min. or more and less than 5 min. |
| Living room light switched to ON | 100% | 1 min. or more and less than 5 min. |
| TV switched to ON | 80% | 1 min. or more and less than 5 min. |
| Air conditioner switched to ON | 65% | 1 min. or more and less than 5 min. |
| ... | ... | ... |

FIG. 5

| State changes in appliances | Occurrence probability within less than 30 sec. | Occurrence probability within a range of 30 sec. or more and less than 3 min. | Occurrence probability within a range of 1 min. or more and less than 5 min. | ... |
|---|---|---|---|---|
| Entrance light switched to ON | 90% | 10% | 10% | |
| Bathroom light switched to ON | 30% | 70% | 60% | |
| Entrance light switched to OFF | 70% | 30% | 10% | |
| Bathroom light switched to OFF | 10% | 20% | 80% | |
| Refrigerator opened | - | 10% | 30% | |
| Refrigerator closed | - | 5% | 10% | |
| ... | | | | |

FIG. 6A

| | Notification | Control and notification | Control | ... |
|---|---|---|---|---|
| Occurrence probability threshold | 20% or more and less than 50% | 50% or more and less than 80% | 80% or more | |
| Estimated occurrence time threshold | 3 min. or more | 30 sec. or more and less than 3 min. | Less than 30 sec. | |

FIG. 6B

| | Notification | Control and notification | Control | ... |
|---|---|---|---|---|
| Occurrence probability threshold | 20% or more and less than 50% | 50% or more and less than 80% | 80% or more | |
| Estimated occurrence time threshold | 3 min. or more | 30 sec. or more and less than 3 min. | Less than 30 sec. | |
| Notification destination | Wall mount controller | Mobile terminal | | |

FIG. 6C

| | Notification | Control and notification | Control | ... |
|---|---|---|---|---|
| Occurrence probability threshold | 20% or more and less than 50% | 50% or more and less than 80% | 80% or more | |
| Estimated occurrence time threshold | 3 min. or more | 30 sec. or more and less than 3 min. | Less than 30 sec. | |
| Appliance state condition | Living room light is off | Living room light is off | | |

Living room light has been turned on. Cancel

Dining room light has been turned on. Cancel

Air conditioner in living room has been turned on. Cancel

FIG. 9

APPLIANCE CONTROL METHOD, RECORDING MEDIUM, AND APPLIANCE CONTROL DEVICE

CROSS REFERENCE TO RELATED APPLICATIONS

This is a continuation application of PCT International Application No. PCT/JP2021/037667 filed on Oct. 12, 2021, designating the United States of America, which is based on and claims priority of Japanese Patent Application No. 2021-000896 filed on Jan. 6, 2021. The entire disclosures of the above-identified applications, including the specifications, drawings and claims are incorporated herein by reference in their entirety.

FIELD

The present disclosure relates to an appliance control method, a recording medium, and an appliance control device.

BACKGROUND

Patent Literature (PTL) 1 discloses a device that presents, to a user of electric appliances, a recommended pattern generated by a recommended pattern generator, general statistics information, and individual statistics information.

CITATION LIST

Patent Literature

PTL 1: Japanese Patent No. 6098273

SUMMARY

Technical Problem

With the technique disclosed in PTL 1 described above, there is a possibility that the appliances are not effectively controlled.

To address this, the present disclosure provides an appliance control method and the like, with which it is possible to effectively control appliances.

Solution to Problem

An appliance control method according to one aspect of the present disclosure includes: acquiring a user action of a user; predicting a plurality of action information items about future user actions of the user based on the user action, the plurality of action information items including a plurality of actions and predicted times at which the plurality of actions are predicted to be performed; determining appliance control operations corresponding to the plurality of actions based on the plurality of actions and the predicted times; and performing the appliance control operations based on the predicted times.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

With the appliance control method and the like according to the one aspect of the present disclosure, it is possible to effectively control appliances.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3A is a diagram showing an example of user actions and state changes in appliances.

FIG. 3B is a diagram showing an example of user actions and state changes in appliances.

FIG. 3C is a diagram showing an example of user actions and state changes in appliances.

FIG. 4 is a diagram showing an example of predicted state changes in appliances.

FIG. 5 is a diagram showing an example of predicted state changes in appliances.

FIG. 6A is a diagram showing an example of a proposed rule.

FIG. 6B is a diagram showing an example of a proposed rule.

FIG. 6C is a diagram showing an example of a proposed rule.

FIG. 9 is a flowchart illustrating an example of an appliance control method according to a variation of the embodiment.

DESCRIPTION OF EMBODIMENT

Figures 1, 2:
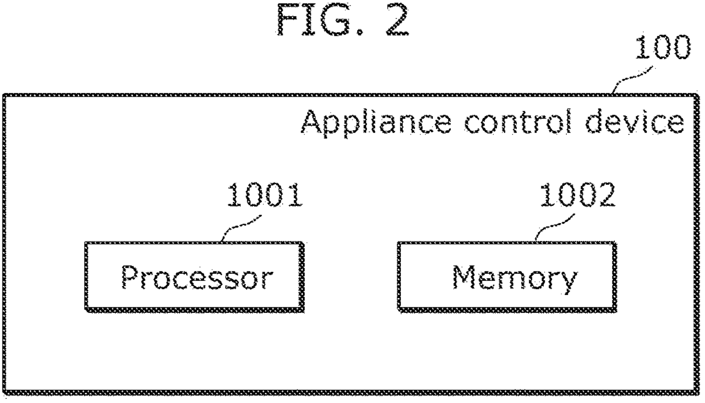
FIG. 1 is a hardware configuration diagram of an appliance control system according to an embodiment.
FIG. 2 is a diagram showing hardware components included in the appliance control device according to the embodiment.

Hereinafter, certain exemplary embodiments are described in greater detail with reference to the accompanying Drawings.

An exemplary embodiment described below shows a generic or specific example of the present disclosure. The numerical values, shapes, materials, structural elements, the arrangement and connection of the structural elements, steps, the order of the steps, and the like shown in the following embodiment are merely examples, and therefore are not intended to limit the scope of the present disclosure.

In addition, the diagrams are not necessarily true to scale. In the diagrams, structural elements that are substantially the same are given the same reference numerals, and a redundant description is omitted or simplified.

Underlying Knowledge Forming Basis of the Present Disclosure

In the case where user's reactions are set as an essential requirement for appliance control, for example, the user needs to perform many reactions, and the user may find it annoying. Also, if a control operation that is not intended by the user is performed when appliance control is automatically performed, the user needs to perform an operation of cancelling the appliance control, and the user may find it annoying. To address this, the inventors of the present application have arrived at the present disclosure described below.

An appliance control method according to one aspect of the present disclosure includes: acquiring a user action of a user; predicting a plurality of action information items about future user actions of the user based on the user action, the plurality of action information items including a plurality of actions and predicted times at which the plurality of actions are predicted to be performed; determining appliance control operations corresponding to the plurality of actions based on the plurality of actions and the predicted times; and performing the appliance control operations based on the predicted times.

With this configuration, appliance control operations determined based on the plurality of user's future actions and the predicted times at which the plurality of user's future actions are predicted to be performed are performed. For this reason, appliance control can be performed automatically without setting user's reactions as an essential requirement for the appliance control. Furthermore, the appliance control operations to be performed are determined based on the plurality of user's future actions and the predicted times at which the plurality of user's future actions are predicted to be performed, and it is therefore possible to increase the possibility that the appliance control performed automatically matches the user's intention. As described above, it is possible to effectively perform appliance control without the user being annoyed.

For example, the plurality of actions may correspond to operations of changing states of appliances that are located in a space in which the user is present.

With this configuration, for example, when an action such as user's home arrival is performed, it is often the case that an operation of changing the state of an entrance light to ON is performed, from which it can be considered that the operations of changing the states of the appliances required in response to a user action are limited to some extent. For this reason, it is possible to predict, based on the user action, operations of changing the states of appliances provided in the space in which the user is present. By extension, it is possible to predict changes in the states of the appliances.

For example, the predicted times may refer to periods from when the plurality of action information items are predicted to when the plurality of actions are predicted to be performed at latest, or timings at which the plurality of actions are predicted to be performed.

As described above, the predicted times may be the periods from when the plurality of action information items are predicted or the timings.

For example, the predicted times may be predicted based on time corresponding to universal time.

For example, the plurality of action information items may further include occurrence probabilities of the plurality of actions, and the appliance control operations corresponding to the plurality of actions may be determined based on the plurality of actions, the predicted times, and the occurrence probabilities.

With this configuration, the appliance control operations to be performed are determined based on the plurality of user's future actions and the predicted times at which the plurality of user's future actions are predicted to be performed, and it is therefore possible to increase the possibility that the appliance control performed automatically matches the user's intention.

For example, the plurality of actions may correspond to operations of changing states of appliances that are located in a space in which the user is present, the appliance control operations corresponding to the plurality of actions may include at least one of: (i) first control that changes a state of a first appliance that is changed by an operation of changing the state of the first appliance without receiving the operation, the operation being included in the operations of changing the states of the appliances that are located in the space in which the user is present; (ii) a set of the first control and second control that issues a notification asking the user to confirm whether to change the first control; and (iii) third control that issues a notification asking the user to confirm whether to perform the first control.

With this configuration, it is possible to perform switching according to the appliance state between (i) first control that automatically performs appliance control, (ii) a set of the first control that automatically performs appliance control and second control that issues a notification asking the user to confirm whether to change the first control to the user; and (iii) third control that issues a notification asking the user to confirm whether to perform the first control to the user.

For example, one of the appliance control operations that corresponds to an action whose occurrence probability is within a first probability range may be determined as the first control, one of the appliance control operations that corresponds to an action whose occurrence probability is within a second probability range that is a range lower than the first probability range may be determined as the set of the first control and the second control, and one of the appliance control operations that corresponds to an action whose occurrence probability is within a third probability range that is a range lower than the second probability range may be determined as the third control.

With this configuration, it is highly likely that the appliance control operations that correspond to actions whose occurrence probability is high match the user's intention. Accordingly, automatic appliance control can be performed. Also, it is likely that the appliance control operations that correspond to actions whose occurrence probability is somewhat low do not match the user's intention, and thus automatic appliance control is performed, and then a notification asking the user to confirm whether to change the automatic appliance control can be issued. Also, it is highly likely that the appliance control operations that correspond to actions whose occurrence probability is low do not match the user's intention, and thus a notification asking the user to confirm whether to perform automatic appliance control can be issued.

For example, one of the appliance control operations that corresponds to an action whose predicted time is within a first period may be determined as the first control, one of the appliance control operations that corresponds to an action whose predicted time is within a second period that is a period after the first period may be determined as the set of the first control and the second control, and one of the appliance control operations that corresponds to an action whose predicted time is within a third period that is a period after the second period may be determined as the third control.

With this configuration, for an action whose predicted time is imminent, rapid control may be required, and thus automatic appliance control can be performed. Also, for an action whose predicted time is somewhat ahead, automatic appliance control is performed, and then a notification asking the user to confirm whether to change the automatic appliance control can be issued. Also, for an action whose predicted time is still ahead, rapid control may not be required, and thus a notification asking the user to confirm whether to perform automatic appliance control can be issued.

For example, the appliance control operations corresponding to the plurality of actions whose predicted times are within a predetermined time range may be performed at a same timing.

With this configuration, the appliance control operations corresponding to actions whose predicted times are close can be performed at the same timing.

A recording medium according to one aspect of the present disclosure is a computer-readable non-transitory recording medium in which a program for causing a computer to execute the appliance control method described above is recorded.

With this configuration, it is possible to provide a program that can effectively control appliances.

An appliance control device according to one aspect of the present disclosure includes a processor and memory, and the processor: (a) acquires a user action of a user sensed by a sensor; (b) predicts a plurality of action information items about future user actions of the user based on the user action, the plurality of action information items including a plurality of actions and predicted times at which the plurality of actions are predicted to be performed; (c) determines appliance control operations corresponding to the plurality of actions based on the plurality of actions and the predicted times by referencing a rule recorded in the memory; and (d) performs the appliance control operations based on the predicted times.

With this configuration, it is possible to provide an appliance control device that can effectively control appliances.

Embodiment

Hereinafter, a certain exemplary embodiment will be described with reference to the accompanying Drawings.

Appliance control system 1 according to an embodiment of the present disclosure will be described first with reference to FIG. 1.

FIG. 1 is a hardware configuration diagram of appliance control system 1 according to the embodiment.

As shown in FIG. 1, appliance control system 1 according to the present embodiment includes appliance control device 100, sensor 200, appliances 300*a* to 300*c*, and appliances 400*a* to 400*c*. Appliances 300*a* to 300*c* and appliances 400*a* to 400*c* are, for example, electronic appliances that are provided in an environment. The environment may be, for example, an indoor space such as a home, an office, or a commercial facility. Here, appliances 300*a* to 300*c* and appliances 400*a* to 400*c* may include appliances of the same type.

(Appliance Control Device 100)

Appliance control device 100 is connected to sensor 200, appliances 300*a* to 300*c*, and appliances 400*a* to 400*c* in either a wired or wireless manner. Appliance control device 100 may be a server. The server includes a physical server and a cloud server. The cloud server is a virtual server provided via a computer network (for example, the Internet). Alternatively, appliance control device 100 may be a computer provided in the environment.

Appliance control device 100 shown in FIG. 1 includes information acquirer 101, predictor 102, control operation determiner 103, and control instruction generator 104.

Information acquirer 101 acquires a user action. Information acquirer 101 may acquire state information items of appliances 300*a* to 300*c* and acquire a user action based on the state information. This is because it is often the case that the states of appliances 300*a* to 300*c* are correlated with user actions, and thus user actions can be acquired from the state information items of appliances 300*a* to 300*c*. For example, by acquiring state information indicating that an entrance light is switched to ON, a user action indicating that user's home arrival can be acquired.

Predictor 102 predicts a plurality of action information items about future user actions of the user based on the user action. Here, the plurality of action information items include a plurality of actions and predicted times at which the plurality of actions are predicted to be performed. The plurality of actions correspond to operations of changing the states of appliances 300*a* to 300*c* that are provided in the space in which the user is present. For example, when an action such as user's home arrival is performed, it is often the case that an operation of changing the state of the entrance light to ON is performed, from which it can be considered that the operations of changing the states of appliances 300*a* to 300*c* required in response to a user action are limited to some extent. For this reason, it is possible to predict, based on the user action, operations of changing the states of appliances 300*a* to 300*c* that are provided in the space in which the user is present. By extension, it is possible to predict changes in the information items of the plurality of appliances 300*a* to 300*c*. Predictor 102 may predict changes in the information items of appliances 300*a* to 300*c* based on the state information items of appliances 300*a* to 300*c*. The changes in the information items of the plurality of appliances 300*a* to 300*c* refer to state changes in appliances 300*a* to 300*c* that will take place at a plurality of future timings or in a plurality of future periods. The changes in the information items of the plurality of appliances 300*a* to 300*c* may be state changes including, for example, a state change after 1 second, a state change after 10 seconds, a state change after 1 minute, a state change during a period of 30 seconds or less from a fixed point in time, a state change during a period of 1 minute or more and 5 minutes or less from a fixed point in time, or the like.

Control operation determiner 103 determines, based on the plurality of actions and the predicted times included in the plurality of action information items, control operations for controlling appliances 400*a* to 400*c* that correspond to the plurality of actions. Specifically, control operation determiner 103 determines, based on the plurality of actions and the predicted times included in the plurality of action information items, control operations for controlling appliances 400*a* to 400*c* that correspond to the plurality of actions by referencing rules that are recorded in memory. Control operation determiner 103 may determine the control operations for controlling appliances 400*a* to 400*c* by using future changes in the information items of the plurality of appliances 300*a* to 300*c*.

Control instruction generator 104 performs the control operations for controlling appliances 400*a* to 400*c* based on the predicted times. For example, control instruction generator 104 transmits, to each of appliances 400*a* to 400*c*, information for causing the appliance to perform the determined control operation at the predicted time.

A detailed description of the structural elements of appliance control device 100 will be given later.

FIG. 2 is a diagram showing hardware components included in appliance control device 100 according to the embodiment.

As shown in FIG. 2, appliance control device 100 includes processor 1001 and memory 1002 that is connected to processor 1001. Memory 1002 may include a ROM (Read Only Memory), a RAM (Random Access Memory), and the like, and can store programs and the like that are executed by processor 1001. Processor 1001 functions as a sequence manager and a device manager when an instruction or a software program stored in memory 1002 is executed. In the case where appliance control device 100 is a cloud server, processor 1001 and memory 1002 function as virtual hardware components. Information acquirer 101, predictor 102, control operation determiner 103, and control instruction generator 104 are implemented by processor 1001 or the like that executes the programs stored in memory 1002. In memory 1002, proposed rules, which will be described later, may be recorded, and correction rules, which will be described later, may be recorded. Here, note that memory 1002 in which the programs are recorded, memory 1002 in which the proposed rules are recorded, and memory 1002 in which the correction rules are recorded may be different memories.

(Sensor 200)

Sensor 200 acquires state information such as the states of appliances 300*a* to 300*c* provided in the environment and the operations to be performed on appliances 300*a* to 300*c*. In the case where appliances 300*a* to 300*c* are, for example, television sets, television set state information includes: information indicating whether each television set is ON or OFF; and details of a TV program being viewed by the television set. Alternatively, in the case where appliances 300*a* to 300*c* are, for example, air conditioners, air conditioner state information includes: information indicating whether each air conditioner is ON or OFF; and air conditioner settings information such as temperature and humidity.

It is sufficient that sensor 200 is provided in the environment. Sensor 200 may be provided in each of appliances 300*a* to 300*c*. Each of the sensors included in appliances 300*a* to 300*c* to implement the functions of appliances 300*a* to 300*c* may be replaced by sensor 200. Alternatively, each of appliances 300*a* to 300*c* may transmit the state information of each of appliances 300*a* to 300*c* to information acquirer 101. In this case, sensor 200 may be omitted. For example, when executing the functions of appliances 300*a* to 300*c*, a log of the execution of the functions of appliances 300*a* to 300*c* may be transmitted to information acquirer 101.

Also, sensor 200 may acquire user information of a user who is present in the environment. The user information includes, for example, user ID for identifying the user, user position, and user action. The user action may be, for example, a movement of the user, an action of the user, or the like.

Sensor 200 may be, for example, a camera. The user ID, the use position, and the user action are identified by using camera images and reference data. Appliance control device 100 may identify the user ID, the user position, the user action, and the user motion. Alternatively, an external processor provided outside of appliance control device 100 may identify the user ID, the user position, and the user action. Other examples of sensor 200 include an infrared sensor, an illuminance sensor, a temperature sensor, a pressure sensor, a distance sensor, and the like.

Sensor 200 may include a controller, and generate information regarding the states of appliances 300*a* to 300*c* or the user based on data obtained through sensing performed by sensor 200. For example, the controller included in sensor 200 may acquire information regarding the amount of power of each of appliances 300*a* to 300*c* from sensor 200 or each of appliances 300*a* to 300*c*. When the amount of power acquired is a predetermined level, the controller included in sensor 200 may determine that the corresponding one of appliances 300*a* to 300*c* is ON.

The controller included in sensor 200 may associate the data obtained through sensing with time, and output the data.

(Appliances 300*a* to 300*c* and Appliances 400*a* to 400*c*)

The state information items of appliances 300*a* to 300*c* are acquired by information acquirer 101. Also, each of appliances 400*a* to 400*c* receives a control instruction from control instruction generator 104, and performs a control operation indicated by the control instruction. Appliances 300*a* to 300*c* and appliances 400*a* to 400*c* may include the same appliances without making any distinction. Hereinafter, in the case where it is unnecessary to make a distinction between appliances 300*a* to 300*c*, appliances 300*a* to 300*c* may also be referred collectively as appliances 300. Also, in the case where it is unnecessary to make a distinction between appliances 400*a* to 400*c*, appliances 400*a* to 400*c* may also be referred collectively as appliances 400.

Appliances 300 and appliances 400 may be, for example, household electric appliances (household electronics), household equipment, mobile terminals, loudspeakers, or the like. Examples of the household electronics include a microwave oven, a rice cooker, a mixer (blender), an electric oven, an electric toaster, an electric pot, a hot plate, IH (induction heating) equipment, a roaster, a bread making machine, an electric pressure cooker, an electric waterless cooker, a multi-cooker, a coffee maker, a refrigerator, a washing machine, a dish washer, a vacuum cleaner, an air conditioner, an air cleaner, a humidifier, a dryer, an electric fan, an ion generator, a TV set, a recorder, and the like. Examples of the household equipment include a light, an electric shutter, an electronic lock, an electric water heater for bath, and the like.

Each appliance 300 may transmit state information related to changes in the state of the appliance such as operation history and control history to information acquirer 101.

(Predicted State Changes in Appliances 300)

Next, predicted state changes in appliances 300 will be described. Predictor 102 predicts a plurality of user action information items at predetermined future timings or in predetermined future periods based on the information acquired by information acquirer 101. Here, predicting a plurality of action information items about future user actions of the user means the same as predicting state changes in appliances 300. This is because, as with the above-described relationship between an action such as user's home arrival and an operation of switching the entrance light to ON, the user actions and the state changes in appliances 300 are correlated with each other.

FIGS. 3A to 3C are diagrams showing examples of user actions and state changes in appliances 300. Specifically, FIGS. 3A to 3C show examples of user actions and state changes in appliances 300 during a period from when the user arrived home to when an air conditioner was switched to ON. From the top, user actions and state changes in appliances 300 are shown in time series together with the times at which the user actions and the state changes in appliances 300 occurred.

In FIGS. 3A to 3C, the user actions shown in No. 1 (arrive home) to No. 3 (move from entrance to hallway A) are the same. However, the user does not necessarily do the same actions every day. Accordingly, the user actions and the state changes in appliances 300 do not necessarily always take place at the same times every day. That is, the user does not necessarily perform the same operations to appliances 300 every day, and thus the same state changes do not take place in appliances 300 every day. Accordingly, a learned model that outputs user actions (state changes in appliances 300) and occurrence probabilities of the user actions can be constructed through learning using the information shown in FIGS. 3A to 3C as learning data. Results output by inputting the information into the learned model correspond to predicted user actions (state changes in appliances 300). In order to construct the learned model, for example, a machine learning algorithm may be used. The user actions or the state changes in appliances 300 that occurred during a predetermined time interval, the time elapsed from when the last state change in prediction target appliance 300 occurred, a predetermined number of user actions or state changes in appliances, or the like may be input to perform learning as to whether a state change will take place in designated appliance 300 after a predetermined period of time. Alternatively, at the same time as when the learning as to whether a state change in designated appliance 300 will take place after a predetermined period of time is performed, learning as to the time required for the state change in in designated appliance 300 to take place may be performed. As a machine learning algorithm that can construct the learned model, for example, a logistic regression model, a decision tree model, a neural network, or the like can be used.

FIGS. 4 and 5 are diagrams showing examples of predicted state changes in appliances 300. The examples of predicted state changes shown in FIGS. 4 and 5 are made based on input information indicating user's home arrival, which has been input into the learned model.

FIG. 4 shows an example of user actions (state changes in appliances 300), occurrence probabilities of the user actions, and estimated occurrence times. The estimated occurrence times correspond to an example of predicted times at which the plurality of user actions are predicted to be performed.

The estimated occurrence times may be periods from when the plurality of action information items are predicted to when user actions (state changes in appliances 300) are predicted to be performed at the latest such as when the input information input into the learned model is acquired, or when the estimated occurrence times and the like are output by using the learned model. The estimated occurrence times may be timings at which the plurality of user actions are predicted to be performed. As described above, the estimated occurrence times may be periods or timings. For example, the estimated occurrence times may be predicted based on the time corresponding to the universal time. Specifically, the estimated occurrence time may be a period of time such as a period of time from aa:bb:cc to xx:yy:zz, or a point in time such as at xx:yy:zz (expressed in units of hh:mm:ss).

Here, the state changes in appliances 300 may mean, for example, state changes in appliances 300 that will take place within a predetermined period of time (or in other words, an estimated occurrence time) based on operations performed on appliances 300 by the user. The predetermined period of time may be, for example, 1 second, 10 seconds, 30 seconds, 1 minute, 5 minutes, or the like. Also, for example, the state changes in appliances shown in FIG. 4 indicate how the states of appliances 300 change in response to the user operating appliances 300. A light is switched to ON based on an operation of switching the light to ON by the user. Accordingly, this action is indicated as a list item "Light switched to ON" in the list shown in FIG. 4, and is associated with the occurrence probability and the estimated occurrence time of the action. As used herein, the term "occurrence probability" refers to the probability of a state change in appliance 300 that will occur in the corresponding estimated occurrence time. The longest time of the estimated occurrence time to be predicted is, for example, a relatively short time such as 5 minutes, 10 minutes, or 30 minutes.

An example of the information to be input into the learned model is information regarding the states of appliances 300*a* to 300*c*. Specifically, appliances 300*a* to 300*c* at the time of user's home arrival are either ON or OFF. That is, information regarding the states of appliances 300*a* to 300*c* at a given timing is input into the learned model. At this time, for example, an output result as shown in FIG. 4 is obtained according to a state in which all of appliances 300*a* to 300*c* are OFF at the time of user's home arrival.

Another example of the information to be input into the learned model is information regarding the time, the user action, or the like. An example of the information regarding the time is the time, the day, and the date. Alternatively, as an example of the information to be input into the learned model, time-series information may be used. An example of the time-series information is: a history of state changes in appliances and features calculated from the history; a history of user actions and features calculated from the history; or the like. Also, prediction may be performed recursively by inputting an output of the learned model into the learned model again.

As shown in FIG. 5, predicted state changes may be information indicating user actions (the states of appliances 300) and occurrence probabilities at every predetermined period of time (at every estimated occurrence time). The predicted state changes shown in FIG. 5 show the occurrence probability within a time span of less than 30 seconds from a predetermined timing (for example, when a plurality of action information items are predicted), the occurrence probability within a time span of 30 seconds or more and less than 3 minutes from the predetermined timing, and the occurrence probability within a time span of 1 minute or more and less than 5 minutes from the predetermined timing. The occurrence probability during each time span is independently calculated.

The list items of the state changes in appliances 300 may be set according to whether the functions of appliances 300*a* to 300*c* provided in the environment are controlled based on the operations performed by the user, instead of according to the state changes in all appliances 300.

For example, in the case where the entrance light is configured to operate based on a human sensor, the state of the entrance light changes based on a result of sensing performed by the human sensor, instead of based on an operation performed by the user. Accordingly, the state change of the entrance light may be deleted from the list items of the state changes in appliances 300. For example, the state change of the entrance light may be deleted from the list items to be output by being deleted from the learning data.

(Determination of Appliance Control Operations)

Next, determination of appliance control operations will be described. Control operation determiner 103 determines appliance control operations for the plurality of actions based on the plurality of user actions and the predicted times. Specifically, control operation determiner 103 determines appliance control operations based on the results of predicted state changes in appliances 300 as shown in FIGS. 4 and 5 and proposed rules as shown in FIGS. 6A to 6C.

FIGS. 6A to 6C are diagrams showing examples of proposed rules.

In each proposed rule, at least occurrence probability threshold, estimated occurrence time threshold, and control operation are associated with each other. In FIGS. 6A to 6C, the control operation is classified into “notification”, “control and notification”, and “control”, and the threshold is classified into “occurrence probability threshold” and “estimated occurrence time threshold”.

For example, when the occurrence probability of a predicted user action (state change in appliance 300) is 80% or more, control operation determiner 103 determines to perform a control operation that is associated with an occurrence probability threshold of 80% or more. The occurrence probability threshold of 80% or more is an example of a first probability range. Also, for example, when the estimated occurrence time of a predicted user action (state change in appliance 300) is less than 30 seconds, control operation determiner 103 determines to perform a control operation that is associated with an estimated occurrence time threshold of less than 30 seconds. The estimated occurrence time threshold of less than 30 seconds is an example of a first period. The item “Control” shown in FIGS. 6A to 6C is an example of first control that changes a state of a first appliance that is changed by an operation of changing the state of the first appliance without receiving the operation. Here, control operation determiner 103 may determine to perform the first control when either one of the occurrence probability or the estimated occurrence time satisfies the corresponding threshold or when both the occurrence probability and the estimated occurrence time satisfy the corresponding thresholds.

For example, when the occurrence probability of a predicted user action (state change in appliance 300) is 20% or more and less than 50%, control operation determiner 103 determines to perform a control operation that is associated with an occurrence probability threshold of 20% or more and less than 50%. The occurrence probability threshold of 20% or more and less than 50% is an example of a third probability range. Also, for example, when the estimated occurrence time of a predicted user action (state change in appliance 300) is 3 minutes or more, control operation determiner 103 determines to perform a control operation that is associated with an estimated occurrence time threshold of 3 minutes or more. The estimated occurrence time threshold of 3 minutes or more is an example of a third period. The item “Notification” shown in FIGS. 6A to 6C is an example of third control that issues, to the user, a notification asking the user to confirm whether to perform the first control that changes the state of the first appliance that is changed by the operation of changing the state of the first appliance. Here, control operation determiner 103 may determine to perform the third control when either one of the occurrence probability or the estimated occurrence time satisfies the corresponding threshold or when both the occurrence probability and the estimated occurrence time satisfy the corresponding thresholds.

For example, when the occurrence probability of a predicted user action (state change in appliance 300) is 50% or more and less than 80%, control operation determiner 103 determines to perform a control operation that is associated with an occurrence probability threshold of 50% or more and less than 80%. The occurrence probability threshold of 50% or more and less than 80% is an example of a second probability range. Also, for example, when the estimated occurrence time of a predicted user action (state change in appliance 300) is 30 seconds or more and less than 3 minutes, control operation determiner 103 determines to perform a control operation that is associated with an estimated occurrence time threshold of 30 seconds or more and less than 3 minutes. The estimated occurrence time threshold of 30 seconds or more and less than 3 minutes is an example of a second period. The item “Control and notification” shown in FIGS. 6A to 6C is an example of a set of first control that changes a state of a first appliance that is changed by an operation of changing the state of the first appliance without receiving the operation and second control that issues a notification asking the user to confirm whether to change the first control. That is, the state of appliance 300 is changed at the same time as when a notification is issued to the user. Here, control operation determiner 103 may determine to perform the set of the first control and the second control when either one of the occurrence probability or the estimated occurrence time satisfies the corresponding threshold or when both the occurrence probability and the estimated occurrence time satisfy the corresponding thresholds. Issuing a notification to the user includes issuing a notification indicating that appliance control has been performed and issuing a notification asking the user to confirm whether to change the appliance control that has been performed. Here, issuing the notification asking the user to confirm whether to change the appliance control includes issuing a notification asking the user to confirm whether to stop the appliance control.

As described above, control operation determiner 103 determines a control operation of appliance 400 that corresponds to an action whose predicted time satisfies a first period as first control, a control operation of appliance 400 that corresponds to an action whose predicted time satisfies a second period that is a period after the first period as a set of first control and second control, and a control operation of appliance 400 that corresponds to an action whose predicted time satisfies a third period that is a period after the second period as third control. Also, control operation determiner 103 determines a control operation of appliance 400 that corresponds to an action whose occurrence probability satisfies a first probability range as first control, a control operation of appliance 400 that corresponds to an action whose occurrence probability satisfies a second probability range as a set of first control and second control, and a control operation of appliance 400 that corresponds to an action whose occurrence probability satisfies a third probability range as third control. Then, control instruction generator 104 outputs an instruction to appliance 400 to perform the determined control operation.

In the case where the control operation indicates a user notification, or in other words, when the second control or the third control is performed, for example, control operation determiner 103 may reference to the current user position information and the position information regarding appliances 400 equipped with a display or a loudspeaker, and issue a notification to the user by using appliance 400 that is closest to the user. At this time, the current user position information and the position information regarding appliances 400 equipped with a display or a loudspeaker may be acquired by sensor 200. In the case where appliances 400 equipped with a display or a loudspeaker are fixedly installed, the position information regarding appliances 400 equipped with a display or a loudspeaker may be recorded in memory.

Notifications may be issued to the user by always using a predetermined appliance. For example, as shown in FIG. 6B, notification destination appliances (or in other words, appliances used to issue notifications) may be designated in advance as a proposed rule. For example, in the case where the predetermined appliance is a mobile terminal, when the distance between the user position and the position of the mobile terminal is a predetermined distance or more, a notification may be issued by outputting a voice that reads out the notification from the mobile terminal. The voice that reads out the notification may be, for example, "Would you like to turn on living room light?". Also, when the distance between the user position and the position of the mobile terminal is less than the predetermined distance, a notification may be issued by displaying the notification on the display of the mobile terminal and outputting a sound indicating that the notification has been received from the mobile terminal.

Also, in the case where the occurrence probability or the estimated occurrence time satisfies the threshold for the third control that issues a notification, or in other words, satisfies the third probability range or the third period, a notification asking the user to confirm whether to perform control or the like is issued. For this reason, a response of the user to the notification is required. Accordingly, in order to improve the possibility for the user to recognize a notification, the notification may be issued to the user by both displaying the notification on the display and outputting a voice that reads out the notification.

In the case where the occurrence probability or the estimated occurrence time satisfies the threshold for the first control that performs appliance control, or in other words, satisfies the first probability range or the first period, although issuing notifications to the user is not required, a notification indicating that the appliance control has been performed may be issued after the appliance control has been performed, or a notification indicating summary information regarding control operations performed during a predetermined period may be issued.

As shown in FIG. 6C, the proposed rule may include an appliance state condition. A control operation is determined when the appliance state condition is satisfied in addition to the thresholds described above. For example, when the occurrence probability of a predicted user action (state change in appliance 300) is 20% or more and less than 50%, and when the living room light is OFF, the third control is determined as the control operation. In other words, even when the occurrence probability of a predicted user action (state change in appliance 300) is 20% or more and less than 50%, when the living room light is ON, the third control is not determined as the control operation.

Next, the processing of appliance control device 100 configured as described above will be described.

Figure 7:
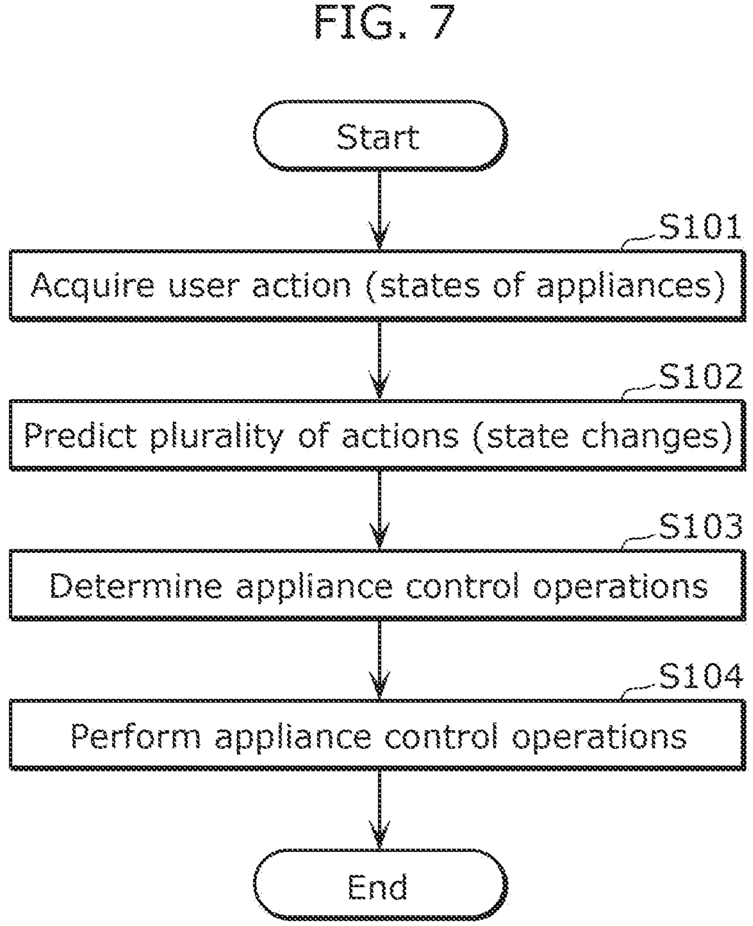
FIG. 7 is a flowchart illustrating an example of an appliance control method according to the embodiment.

FIG. 7 is a flowchart illustrating an example of an appliance control method according to the embodiment. The appliance control method is executed by appliance control device 100. Accordingly, it can also be said that FIG. 7 is a flowchart illustrating an example of an operation of appliance control device 100 according to the embodiment.

(Step S101)

Information acquirer 101 acquires a user action (state information of appliance 300). Here, as an example of the user action, it is assumed that the user has arrived home. In the case where, for example, appliance 300 includes an entrance light and interior lights provided inside home, it is presumed that all the lights are OFF for a predetermined period of time or more while the user is not at home. After that, when the user arrives home, state information indicating that the entrance light is switched to ON and the interior lights remain OFF is acquired. As described above, state information (state changes) of appliances 300 indicating that, after all the lights were OFF for a predetermined period of time or more, the entrance light is switched to ON and the interior lights remain OFF, or in other words, a user action indicating user's home arrival is acquired. For example, information acquirer 101 may also acquire, as the user action, the time at which the state was changed from a state in which all the lights were OFF to a state in which the entrance light is switched to ON and the interior lights remain OFF.

(Step S102)

Predictor 102 predicts a plurality of action information items about future user actions of the user (a plurality of state changes in appliances 300) by using the user action indicating that, after all the lights were OFF for a predetermined period of time or more, the entrance light is switched to ON and the interior lights remain OFF, and a learned model. For example, predictor 102 predicts a plurality of state changes in appliances 300 as shown in FIG. 4 after the user's home arrival. Predictor 102 may perform prediction at every predetermined period of time. The predetermined period of time may be, for example, 30 seconds, 1 minute, 5 minutes, or the like. That is, information indicating a plurality of state changes in appliances 300 as shown in FIG. 4 may be obtained at every predetermined period of time. Alternatively, predictor 102 may perform prediction when the next state change in appliance 300 takes place. It is presumed that a new state change in appliance 300 is a timing at which the user transitions to the next action, and thus this timing is suitable to perform control, which will be described later.

(Step S103)

Control operation determiner 103 determines a control operation of controlling an appliance based on the results of predicted state changes in appliances 300 and the proposed rules. Referring to FIG. 4, the occurrence probability of the item "Entrance light switched to ON" is set to 100%, and the estimated occurrence time is set to less than 30 seconds, which corresponds to an occurrence probability threshold of 80% or more and an estimated occurrence time threshold of less than 30 seconds under the item "Control" (or in other words, first control) in the proposed rule shown in FIG. 6A. Accordingly, control operation determiner 103 determines to perform control to switch the entrance light to ON. For example, control operation determiner 103 determines to immediately perform control to switch the entrance light to ON because the estimated occurrence time is set to less than 30 seconds. Also, referring to FIG. 4, the occurrence probability of the item "Bathroom light switched to ON" is set to 70%, and the estimated occurrence time is set to 30 seconds or more and less than 3 minutes, which corresponds to an occurrence probability threshold of 50% or more and less than 80% and an estimated occurrence time threshold of 30 seconds or more and less than 3 minutes shown under the item "Control and notification" (or in other words, a set of first control and second control) in the proposed rule shown in FIG. 6A. Accordingly, control operation determiner 103 determines to perform control to switch the bathroom light to ON and issue a notification asking the user to confirm whether to cancel the switching of the bathroom light to ON. For example, control operation determiner 103 determines to perform control to switch the bathroom light to ON 30 seconds later because the estimated occurrence time is set to 30 seconds or more and less than 3 minutes.

(Step S104)

Control instruction generator 104 outputs the control operation determined by control operation determiner 103 to appliance 400. For example, control instruction generator 104 soon outputs an instruction to switch the entrance light to ON to the entrance light. Then, 30 seconds later, control instruction generator 104 outputs an instruction to switch the bathroom light to ON and a notification asking the user to confirm whether to cancel the switching of the bathroom light to ON.

Control instruction generator 104 may output, for example, an instruction to switch the entrance light to ON and an instruction to switch the bathroom light to ON directly to the entrance light and the bathroom light, respectively. Alternatively, in the case where the entrance light and the bathroom light are under control of a cloud server, control instruction generator 104 outputs an instruction to switch the entrance light to ON and an instruction to switch the bathroom light to ON to the cloud server.

Figure 8A:
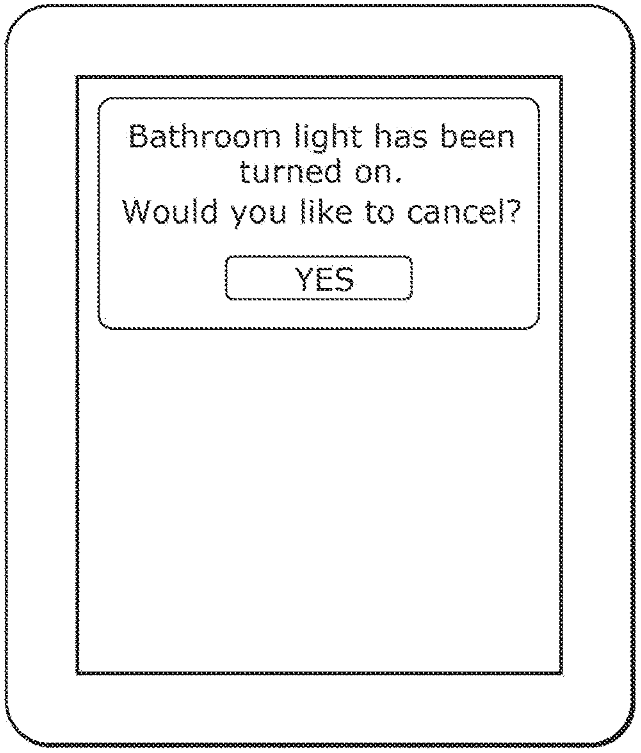
FIG. 8A is a diagram showing an example of a notification.
Figure 8B:
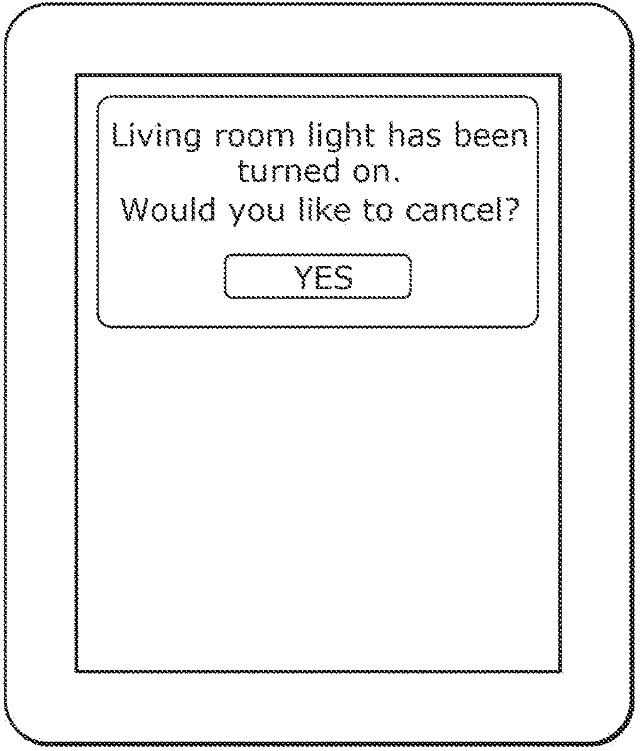
FIG. 8B is a diagram showing an example of a notification.

Notification to cancel the switching of the bathroom light to ON is performed by identifying appliance 400 equipped with a loudspeaker provided at the entrance that is closest to the user, and issuing a notification such as a notification indicating "Bathroom light has been turned on. Would you like to cancel?" as shown in FIG. 8A from appliance 400 that has been identified. After appliance 400 has issued the notification, when a cancellation instruction is received from the user, control instruction generator 104 outputs an instruction to switch the bathroom light to OFF. FIG. 8B shows another example of a notification that is displayed.

Appliance 400 is controlled based on the instruction output from control instruction generator 104. As described above, a user's future action (for example, an operation of appliance 300) is predicted, and appliance control or a proposal of appliance control is made according to the accuracy of the prediction. In particular, by switching according to the prediction between an operation of automatically performing control and an operation of issuing a notification asking the user for confirmation, it is possible to perform appliance control while confirming the intention of the user. Also, the operation of issuing a notification asking the user for confirmation includes an operation of performing control and an operation of asking the user to confirm whether to cancel the control. For example, it is possible to reduce the possibility that, in the case where user's reactions are set as an essential requirement for performing control, the user needs to perform many reactions, and the user finds it annoying. Here, an example has been described in which a control operation is determined based on the estimated occurrence time and the occurrence probability. However, the occurrence probability does not necessarily need to be used to determine the control operation.

When a cancellation instruction is received from the user, control instruction generator 104 may update the parameters of the proposed rules shown in FIGS. 6A to 6C. For example, the value of 50% or more and less than 80% may be updated to a value of 60% or more and less than 80%.

Also, an example has been described in which, after control is performed to change the state of appliance 400, a notification asking the user to confirm whether to cancel the control is issued. However, a notification other than the notification asking the user to confirm whether to cancel the control may be issued. For example, a notification asking the user to confirm whether to perform control that is different from the control to change the state of appliance 400 may be issued. For example, control may be performed to switch a light to ON at a predetermined brightness level, and thereafter a notification asking the user to confirm whether to change the brightness level to a different level may be issued.

Also, control instruction generator 104 may control appliances 400 that correspond to a plurality of actions whose predicted time, which is the time at which the action is predicted to be performed, is within a predetermined time range, at the same timing. That is, appliances 400 that correspond to the actions whose predicted time is close may be collectively controlled at the same timing.

(Notification Issued by Appliance 400)

Figures 8C, 8D:
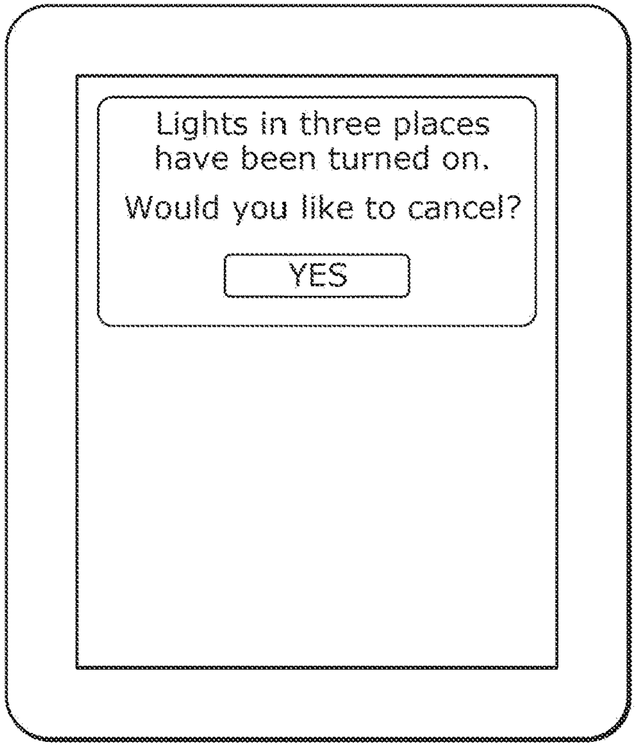
FIG. 8C is a diagram showing an example of a notification.
FIG. 8D is a diagram showing an example of a notification.

Each appliance 400 may include a presenter, and the presenter may present notification information. In the case of the third control that only issues a notification, the notification information may include display information indicating that appliance control is ready to be performed and display information for performing the appliance control. For example, the display information for performing the appliance control may be a button, an icon, or the like for performing the appliance control. As a result of the display information (a button, an icon, or the like) for performing the appliance control being operated, an instruction to perform the appliance control is output. In the case of the second control that performs control and issues a notification, the notification information may include display information indicating that the appliance control has been performed and display information for cancelling the appliance control. For example, the display information for cancelling the appliance control may be a button, an icon, or the like for cancelling the appliance control that has been performed. As a result of the display information (a button, an icon, or the like) for cancelling the appliance control being operated, an instruction to cancel the appliance control that has been performed is output. The presenter may be, for example, a display or a loudspeaker. In the case where the presenter is a display, as shown in FIGS. 8A to 8D, the presenter displays text information. The text "YES" shown in FIGS. 8A to 8C and the text "Cancel" shown in FIG. 8D are an example of the display information for cancelling the appliance control. In the case where the presenter is a loudspeaker, the presenter outputs voice information such as "Bathroom light has been turned on. Would you like to cancel?". In the case where a plurality of control operations have been determined to be performed at the same timing, the presenter may present a single notification collectively indicating that the plurality of control operations have been performed as shown in FIGS. 8C and 8D.

Variations

Control operation determiner 103 may correct a control operation selected using the proposed rules shown in FIGS. 6A to 6C.

Figure 9:
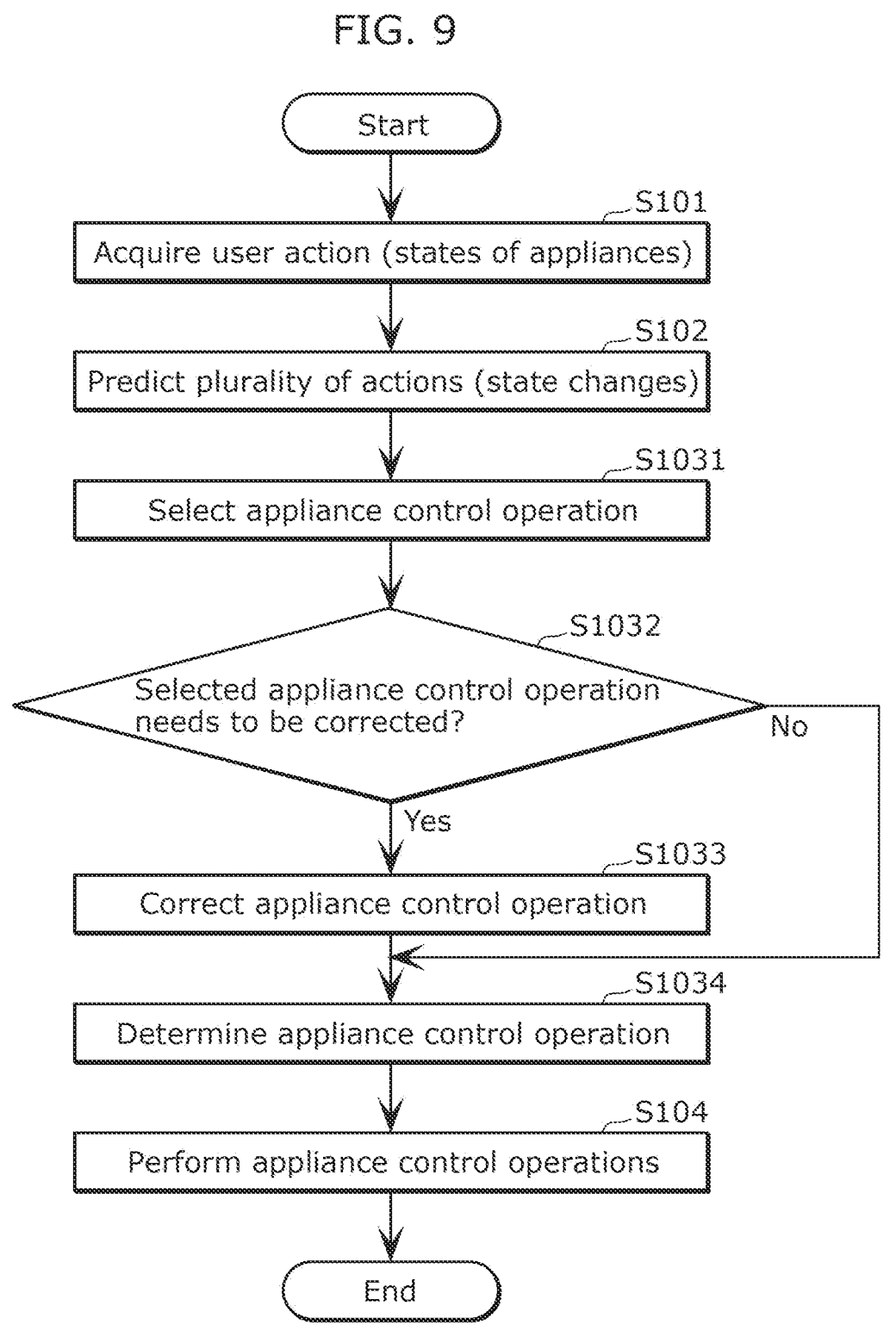

FIG. 9 is a flowchart illustrating an example of an appliance control method according to a variation of the embodiment. As with FIG. 7, it can also be said that FIG. 9 is a flowchart illustrating an example of an operation of appliance control device 100 according to the variation of the embodiment. The flowchart shown in FIG. 9 includes steps S1031 to S1034 instead of step S103 included in the flowchart shown in FIG. 7. Steps S101, S102, and S104 included in the flowchart shown in FIG. 9 are the same as those shown in FIG. 7. Accordingly, a description thereof is omitted here.

(S1031)

Control operation determiner 103 selects an appliance control operation based on the results of predicted state changes in appliances 300 and the proposed rules. The method for selecting an appliance control operation is the same as the method for determining an appliance control operation performed in step S103 in the flowchart shown in FIG. 7.

(S1032)

Control operation determiner 103 references the correction rules, and determines whether the selected control operation needs to be corrected. If it is determined that the selected control operation needs to be corrected, the processing advances to S1033. If it is determined that the selected control operation does not need to be corrected, the processing advances to S1034. Details of the correction rules will be given later.

(S1033)

Control operation determiner 103 corrects the selected control operation by referencing the correction rules.

(S1034)

If it is determined, based on the correction rules, that the selected control operation needs to be corrected, control operation determiner 103 determines a corrected control operation as the control operation. If it is determined, based on the correction rules, that the selected control operation does not need to be corrected, control operation determiner 103 determines the control operation selected based on the proposed rules as the control operation.

Next, the correction rules will be described. For example, the correction rules include a first correction rule, a second correction rule, and a third correction rule.

The first correction rule indicates that a control operation is not determined or not performed within a predetermined period of time after the control operation has been determined or performed. For example, in the case where, after a control operation was determined, the same control operation is again selected before a predetermined period of time elapses after the control operation was determined, the control operation may be corrected such that the selected control operation is not to be performed so as not to perform the selected control operation (or in other words, a corrected control operation of not performing the selected control operation may be performed). However, a setting may be made such that, in the case where the user has moved to a place different from the place where the user performed the control operation immediately before the user performed the control operation, the first correction rule is not applied.

The second correction rule indicates that, when a control operation selected based on a predetermined input is an operation of issuing a notification (or in other words, the third control), the operation of issuing a notification is not performed. The predetermined input may be, for example, a user action such as waking up or arriving home. For example, it is often the case that the user sequentially performs predetermined operations after the user wakes up, after the user arrives home, or the like. Accordingly, if notifications are frequently issued, the user may find it annoying. For this reason, in this case, the control operation may be corrected such that the third control that only issues a notification is not to be performed so as not to perform the selected control operation (the third control). That is, in this case, only either one of control and notification (or in other words, the second control) or control (or in other words, the first control) may be performed.

The third correction rule indicates that a selected control operation is not performed when, out of a plurality of predictions made, the number of predictions that undergone change over time is small. For example, in the case where a plurality of steps are predicted, when there is no change in a predetermined number of steps out of the plurality of steps predicted, the control operation may not be performed. For example, in the case where 10 steps are predicted, when there is no change in 3 steps or more, the control operation is not performed. Also, when the estimated occurrence time of a state change in appliance 300 is close to the current time, the state change in appliance 300 may be weighed more than when the estimated occurrence time of the state change in appliance 300 is not close to the current time. For example, a coefficient of 1.0 may be set for a change in the first three steps, a coefficient of 0.5 may be set for a change in the remaining fourth to tenth steps. Then, the coefficient of a step that has undergone change may be multiplied by 1, and the coefficient of a step that has not undergone change may be multiplied by 0. Then, the sum of products obtained through multiplication performed in each step may be obtained, and whether the number of predictions that have undergone change is small may be determined based on whether the obtained sum is a predetermined value or more.

As described above, control operations of appliances 400 determined based on the plurality of user's future actions (state changes in appliances 300) and the predicted times at which the plurality of user's future actions (the state changes) are predicted to be performed, are performed. For this reason, appliances 400 can be controlled automatically without using user's reactions as an essential requirement for the control of appliances 400. Furthermore, the control operations of appliances 400 to be performed are determined based on the plurality of user's future actions (state changes in appliances 300) and the predicted times at which the plurality of user's future actions (the state changes) are predicted to be performed, and it is therefore possible to increase the possibility that the control of appliances 400 performed automatically matches the user's intention. As described above, it is possible to effectively control appliances 400.

OTHER EMBODIMENTS

Up to here, the appliance control method and appliance control device 100 according to one or more aspects of the present disclosure have been described above by way of the embodiment, but the present disclosure is not limited to the embodiment given above. Other embodiments obtained by making various modifications that can be conceived by a person having ordinary skill in the art to the above embodiment as well as embodiments constructed by combining structural elements of different embodiments without departing from the gist of the present disclosure may also be encompassed within the scope of the one or more aspects of the present disclosure.

For example, the present disclosure can be realized as a program that causes a processor (computer) to perform the steps included in the appliance control method. Furthermore, the present disclosure can be realized as a non-transitory computer-readable recording medium, such as a CD-ROM, in which the program is recorded.

For example, in the case where the present disclosure is realized as the program (software), the steps of the appliance control method are performed by the program being executed by using hardware resources such as a CPU, memory, an input/output circuit, and the like of the computer. That is, the steps of the appliance control method are performed by the CPU acquiring data from the memory, the input/output circuit, or the like to perform computation, and outputting the result of computation to the memory, the input/output circuit, or the like.

Each of the structural elements included in appliance control device 100 according to the embodiment given above may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

Some or all of the functions of appliance control device 100 according to the embodiment given above may be typically realized as LSIs, which are integrated circuits. These may be individual single chips, or a part or all of these may be configured in a single chip. Also, implementation of an integrated circuit is not limited to an LSI, and may be realized by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

INDUSTRIAL APPLICABILITY

The present disclosure is applicable to a system that automatically controls electronic appliances and the like in a facility.

The invention claimed is:

1. An appliance control method comprising:

acquiring a user action of a user;

predicting a plurality of action information items about future user actions of the user based on the user action, the plurality of action information items including a plurality of actions and predicted times at which the plurality of actions are predicted to be performed;

determining appliance control operations corresponding to the plurality of actions based on the plurality of actions and the predicted times; and performing the appliance control operations based on the predicted times, wherein the plurality of action information items further include occurrence probabilities of the plurality of actions, the appliance control operations corresponding to the plurality of actions are determined based on the plurality of actions, the predicted times, and the occurrence probabilities, the plurality of actions correspond to operations of changing states of appliances that are located in a space in which the user is present, the appliance control operations corresponding to the plurality of actions include at least one of:

(i) first control that changes a state of a first appliance that is changed by an operation of changing the state of the first appliance without receiving the operation, the operation being included in the operations of changing the states of the appliances that are located in the space in which the user is present;

(ii) a set of the first control and second control that issues a notification asking the user to confirm whether to change the first control; and (iii) third control that issues a notification asking the user to confirm whether to perform the first control, one of the appliance control operations that corresponds to an action whose occurrence probability is within a first probability range is determined as the first control, one of the appliance control operations that corresponds to an action whose occurrence probability is within a second probability range that is a range lower than the first probability range is determined as the set of the first control and the second control, and one of the appliance control operations that corresponds to an action whose occurrence probability is within a third probability range that is a range lower than the second probability range is determined as the third control.

2. The appliance control method according to claim 1, wherein the plurality of actions correspond to operations of changing states of appliances that are located in a space in which the user is present.

3. The appliance control method according to claim 1, wherein the predicted times are periods from when the plurality of action information items are predicted to when the plurality of actions are predicted to be performed at latest, or timings at which the plurality of actions are predicted to be performed.

4. The appliance control method according to claim 1, wherein the predicted times are predicted based on time corresponding to universal time.

5. The appliance control method according to claim 1, wherein the plurality of action information items further include occurrence probabilities of the plurality of actions, and the appliance control operations corresponding to the plurality of actions are determined based on the plurality of actions, the predicted times, and the occurrence probabilities.

6. The appliance control method according to claim 1, wherein the appliance control operations corresponding to the plurality of actions whose predicted times are within a predetermined time range are performed at a same timing.

7. A computer-readable non-transitory recording medium in which a program for causing a computer to execute the appliance control method according to claim 1 is recorded.

8. An appliance control device comprising:

a processor; and memory, wherein the processor:

(a) acquires a user action of a user sensed by a sensor;

(b) predicts a plurality of action information items about future user actions of the user based on the user action, the plurality of action information items including a plurality of actions and predicted times at which the plurality of actions are predicted to be performed;

(c) determines appliance control operations corresponding to the plurality of actions based on the plurality of actions and the predicted times by referencing a rule recorded in the memory; and (d) performs the appliance control operations based on the predicted times, wherein the plurality of action information items further include occurrence probabilities of the plurality of actions, the processor determines the appliance control operations corresponding to the plurality of actions based on the plurality of actions, the predicted times, and the occurrence probabilities, the plurality of actions correspond to operations of changing states of appliances that are located in a space in which the user is present, the appliance control operations corresponding to the plurality of actions include at least one of:

(i) first control that changes a state of a first appliance that is changed by an operation of changing the state of the first appliance without receiving the operation, the operation being included in the operations of changing the states of the appliances that are located in the space in which the user is present;

(ii) a set of the first control and second control that issues a notification asking the user to confirm whether to change the first control; and (iii) third control that issues a notification asking the user to confirm whether to perform the first control, the processor:

determines one of the appliance control operations that corresponds to an action whose occurrence probability is within a first probability range as the first control;

determines one of the appliance control operations that corresponds to an action whose occurrence probability is within a second probability range that is a range lower than the first probability range as the set of the first control and the second control; and determines one of the appliance control operations that corresponds to an action whose occurrence probability is within a third probability range that is a range lower than the second probability range as the third control.

9. An appliance control method comprising:

acquiring a user action of a user;

predicting a plurality of action information items about future user actions of the user based on the user action, the plurality of action information items including a plurality of actions and predicted times at which the plurality of actions are predicted to be performed;

determining appliance control operations corresponding to the plurality of actions based on the plurality of actions and the predicted times; and performing the appliance control operations based on the predicted times, wherein the plurality of actions correspond to operations of changing states of appliances that are located in a space in which the user is present, the appliance control operations corresponding to the plurality of actions include at least one of:

(i) first control that changes a state of a first appliance that is changed by an operation of changing the state of the first appliance without receiving the operation, the operation being included in the operations of changing the states of the appliances that are located in the space in which the user is present;

(ii) a set of the first control and second control that issues a notification asking the user to confirm whether to change the first control; and (iii) third control that issues a notification asking the user to confirm whether to perform the first control, one of the appliance control operations that corresponds to an action whose predicted time is within a first period is determined as the first control, one of the appliance control operations that corresponds to an action whose predicted time is within a second period that is a period after the first period is determined as the set of the first control and the second control, and one of the appliance control operations that corresponds to an action whose predicted time is within a third period that is a period after the second period is determined as the third control.

10. An appliance control device comprising:

a processor; and memory, wherein the processor:

(a) acquires a user action of a user sensed by a sensor;

(b) predicts a plurality of action information items about future user actions of the user based on the user action, the plurality of action information items including a plurality of actions and predicted times at which the plurality of actions are predicted to be performed;

(c) determines appliance control operations corresponding to the plurality of actions based on the plurality of actions and the predicted times by referencing a rule recorded in the memory; and (d) performs the appliance control operations based on the predicted times, wherein the plurality of actions correspond to operations of changing states of appliances that are located in a space in which the user is present, the appliance control operations corresponding to the plurality of actions include at least one of:

(i) first control that changes a state of a first appliance that is changed by an operation of changing the state of the first appliance without receiving the operation, the operation being included in the operations of changing the states of the appliances that are located in the space in which the user is present;

(ii) a set of the first control and second control that issues a notification asking the user to confirm whether to change the first control; and (iii) third control that issues a notification asking the user to confirm whether to perform the first control, the processor:

determines one of the appliance control operations that corresponds to an action whose predicted time is within a first period as the first control;

determines one of the appliance control operations that corresponds to an action whose predicted time is within a second period that is a period after the first period as the set of the first control and the second control; and determines one of the appliance control operations that corresponds to an action whose predicted time is within a third period that is a period after the second period as the third control.

* * * * *